US006673868B2

(12) United States Patent
Choulet

(10) Patent No.: US 6,673,868 B2
(45) Date of Patent: Jan. 6, 2004

(54) POLYMERIC COMPOSITIONS AND PROCESSES FOR PROVIDING WEATHERABLE FILM AND SHEET

(75) Inventor: Olivier Jacques Choulet, Grasse (FR)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/844,534

(22) Filed: Apr. 27, 2001

(65) Prior Publication Data

US 2001/0049416 A1 Dec. 6, 2001

(30) Foreign Application Priority Data

May 3, 2000 (EP) .............................................. 00401208

(51) Int. Cl.$^7$ ............................ C08L 51/04; C08L 51/00
(52) U.S. Cl. .............................. 525/70; 525/71; 525/80
(58) Field of Search ................................ 525/70, 71, 80

(56) References Cited

U.S. PATENT DOCUMENTS

| 4,086,296 A |   | 4/1978 | Carty et al. |
| 4,385,152 A |   | 5/1983 | Boyack et al. |
| 5,318,737 A |   | 6/1994 | Trabert et al. |
| 5,612,413 A | * | 3/1997 | Rozkuszka et al. ............ 525/85 |
| 5,760,134 A |   | 6/1998 | Guntherberg et al. |
| 5,877,258 A |   | 3/1999 | Guntherberg et al. |
| 6,518,361 B1 |   | 2/2003 | Guntherberg et al. |

FOREIGN PATENT DOCUMENTS

| EP | 0 096 412 A2 | 12/1983 |
| EP | 0 110 123 A1 | 6/1984 |
| EP | 0 465 049 A2 | 1/1992 |
| EP | 0 473 379 A | 3/1992 |
| EP | 0 580 046 A1 | 1/1994 |
| EP | 0 659 829 B1 | 9/1998 |
| JP | Hei 2-166148 | 6/1990 |
| JP | Hei 6-91822 | 4/1994 |
| JP | Hei 9-100385 | 4/1997 |
| JP | Hei 11-58627 | 3/1999 |
| WO | WO 97/41174 | 11/1997 |
| WO | WO 99/54401 | 10/1999 |
| WO | WO 00/08098 | 2/2000 |

OTHER PUBLICATIONS

EPO Search, EP Pat. App. 0 01303674.4, Aug. 1, 2001.
Nikitin, The Chemistry of Cellulose and Wood, p. 62–71 (1966).*
Mandelkern, An Introducton To Macromolecules, p. 19–27, Springer Verlag (1983).*
Hiemenz, Polymer Chemistry, p. 34–43, Marcel Dekker (1984).*
Fried, Polymer Science and Technology, "1.3 Molecular Weight", p. 16–18, Prentice Hall (1995).*
EPO Search Report, EP Pat. App.NO 00401208.4–2109, Aug. 11, 2000.
Summers, J.W. "Outdoor Weatherability of Composite Materials made by Coextrusion or Lamination", Soc. Plast. Eng., Tech. Pap. (1977), 23,240–3.

* cited by examiner

*Primary Examiner*—Jeffrey Mullis
(74) *Attorney, Agent, or Firm*—Carl P. Hemenway

(57) ABSTRACT

The present invention discloses polymeric compositions containing a vinylaromatic lubricating copolymer which can be melt processed to provide plastic films or layers having excellent optical, printing, weathering, and tensile impact resistance characteristics. The present invention also discloses a processes for preparing plastic films of the compositions of the present invention. The present invention also discloses composite articles having the plastic films of the present invention and an underlying substrate.

12 Claims, No Drawings

POLYMERIC COMPOSITIONS AND PROCESSES FOR PROVIDING WEATHERABLE FILM AND SHEET

The present invention relates to polymeric compositions which can be melt processed to provide plastic films or layers having excellent optical, printing, weathering, and tensile impact resistance characteristics. The present invention also relates to processes for preparing plastic films of the compositions of the present invention. The present invention also relates to composite articles having the plastic films of the present invention and an underlying substrate.

Poly(vinyl chloride) resin ("PVC") has a combination of properties which make it particularly useful as a structural material which can be readily extruded or formed into a variety of articles; for example as siding for buildings, shutters, profiles for window and door frames, rain carrying systems (e.g., gutters and downspouts), and fencings.

Unfortunately, PVC compositions have relatively poor weatherability characteristics, particularly poor color retention in darker grade colors. The color is imparted to the PVC composition, for instance, by the use of colorants such as pigments or dyes, but exposure to sunlight causes unappealing changes in the colors. Poor weathering characteristics also causes reduction in tensile impact resistance leading to embrittlement and cracking and/or mechanical failure of the articles prepared from such compositions. Thus, there is a need for improving the weathering characteristics of such materials.

One solution is to provide a laminated film or coextruded layer for PVC profile (e.g., used in building and construction applications), the film or coextruded layer having transparency, weatherability, impact resistance, good printability, and adhesion to the PVC. The film or coextruded layer can also provide UV barrier capabilities allow the use of less expensive nonweatherable substrate materials, such as PVC.

The capstock generally is much thinner than the substrate plastic, typically being about 0.1 to about 25% of the total thickness of the composite. Suitable polymeric compositions for use as capstock must be melt processable using calendering, extrusion, or coextrusion processes to forms films or layers. Capstocks which are melt calendered or extruded into a film are subsequently laminated to the substrate. Alternatively, if the substrate is comprised of a thermoplastic resin such as PVC, the polymer composition can be co-extruded with the substrate. As well, the polymer compositions must adhere well to the substrate and have excellent weathering characteristics, high tensile impact resistance, and good clarity (low haze).

One remedy has been to apply a protective polymethyl methacrylate ("PMMA") homopolymer, or copolymer-based films or layers ("capstock") over PVC articles ("substrate") to improve its weathering characteristics. U.S. Pat. No. 5,318,737 to Rohm and Haas Company describes a method for preparing a plastic composite by feedblock coextrusion of a molten acrylic based capstock overlying and integrally bonded to an underlying structural plastic ply. The composition of the capstock contains from about 40 to about 88 wt. % of an acrylic polymer having a molecular weight of at least about 125,000 g/mol, and from about 12 to about 60 wt. % of an acrylate-based impact modifier resin in the form of discrete multi-layered polymeric particles.

Japanese Kokai Publication Hei 9-100,385 discloses acrylic polymer compositions having an acrylic resin, a lubricant, and optionally a plasticizer and vinyl chloride resin for calendering molding sheets and films having weatherability, transparency, and high tensile impact resistance for applying to wallpaper and outdoor signs. This publication discloses that a lubricant allows the acrylic resin to be calendered into film and sheet by reducing sticking of the acrylic resin to the calender rolls, thereby improving the metal release property. However, I have discovered that the range of various lubricants disclosed in this publication (e.g., all-acrylic polymers, calcium stearate, and polyethylene wax) cause high haze in polymer compositions.

I have now discovered new polymeric compositions which can be calendered or extruded into film and sheet, or alternatively coextruded with thermoplastic resins, to provide a protective capstock layer having superb weatherability, tensile impact resistance, and transparency (low haze). Specifically, I have discovered that particular vinyl aromatic ("VA") copolymer lubricants in combination with processing aid polymers enable acrylic core-shell graft-co-polymers to be calendered or extruded into film and sheet having superb weatherability, tensile impact resistance, and transparency (low haze).

I have also discovered that the new polymeric compositions can further contain acrylic impact modifiers to substantially increase its tensile impact resistance without decreasing its weatherability. These impact-modified compositions can also be calendered and extruded into film and sheet, and can be coextruded with thermoplastic resins to provide capstock film and capped articles.

Therefore, one object of the present invention is to provide a polymeric composition which can be calendered or extruded into film or sheet, or which can be coextruded with thermoplastic resins, the film or sheet having superb weatherability, tensile impact resistance, and transparency (low haze).

A second object of the invention is to provide a polymeric composition which can be calendered or extruded into film or sheet, or which can be coextruded with thermoplastic resins, the film or sheet having superb weatherability and exceptional tensile impact resistance.

A third object of the invention is to provide a plastic film or sheet having superb weatherability, tensile impact resistance, and transparency (low haze).

A fourth object of the invention is to provide composite articles having superb weatherability and excellent tensile impact resistance.

A fifth object of the invention is to provide a process for preparing the plastic films of the present invention.

These and other objects, as will become apparent from the following disclosure, are achieved by the present invention.

In the present invention, the problem of providing polymeric compositions which can be calendered or extruded into film or sheet, or which can be coextruded with thermoplastic resins, the film or sheet having superb weatherability, tensile impact resistance, and transparency (low haze) is solved by providing particular vinyl aromatic copolymer lubricants in combination with particular processing aid polymers that enable the the melt-processing (calendering, extrusion, or coextrusion) of acrylic core-shell graft-co-polymer matrix resins.

In a first aspect of the present invention, there is provided a polymeric composition, comprising:
  (A) 100 parts by weight of an acrylic core-shell graft-co-polymer, comprising
    (i) from 20% to 70% by weight of an acrylic rubbery core polymer based on the total weight of the acrylic core-shell graft-co-polymer and
    (ii) from 30% to 80% by weight of an acrylic hard shell polymer based on the total weight of the acrylic core-shell graft-co-polymer;

(B) from 1 to 40 parts by weight of a processing aid polymer, wherein the molecular weight of the processing aid polymer is greater than 1 million g/mol; and (C) from 0.1 to 10 parts by weight of a VA lubricating copolymer, comprising
  (i) from 20% to 70% by weight of polymerizable units derived from one or more vinyl aromatic monomers; and
  (ii) from 30% to 80% by weight of polymerizable units derived from one or more ethylenically unsaturated monomers,
  wherein the molecular weight of the VA lubricating copolymer is in the range of from 20,000 g/mol to 1 million g/mol.

In a second aspect of the present invention, there is provided a polymeric composition, comprising:

(A) 100 parts by weight of an acrylic core-shell graft-co-polymer, comprising
  (i) from 35% to 45% by weight of an acrylic rubbery core polymer based on the total weight of the acrylic core-shell graft-co-polymer; and
  (ii) from 55% to 65% by weight of an acrylic hard shell polymer based on the total weight of the acrylic core-shell graft-co-polymer;

(B) from 2 to 25 parts by weight of a processing aid polymer, wherein the molecular weight of the processing aid polymer is in the range of from 1.5 to 6 million g/mol;

(C) from 0.5 to 2 parts by weight of a VA lubricating copolymer, comprising
  (i) from 20% to 70% by weight of polymerizable unite derived from styrene, and
  (ii) from 30% to 80% by weight of polymerizable units selected from the group consisting of acrylonitrile, C1 to C8 alkyl acrylates, C1 to C4 alkyl methacrylates, and mixtures thereof
  wherein the molecular weight of the (C) VA lubricating copolymer is in the range of from 50,000 to 800,000 g/mol and (D) from 5 to 50 parts by weight of an acrylic impact modifier.

In a third aspect of the present invention, there is provided a plastic film having good processability, weathering properties, an tensile impact resistance prepared from the polymeric composition according to either the first or second aspects of the present invention.

In a fourth aspect of the present invention, there is provided a process for preparing a plastic film having good weathering and printing properties, comprising the steps of:
(I) feeding the polymeric composition of the present invention into a pre-melting device;
(II) heating the polymeric composition to a temperature at least 150° C. in the pre-melting device to form a gel,
(III) heating the gel to a temperature at least 170° C. to form a melt;
(IV) forming the melt into a molten film having a thickness in the range of from 30 to 2,000 microns; and
(V) cooling the molten film.

In a fifth aspect of the present invention, there is provided a composite article, comprising the plastic film of the present invention, the plastic film affixedly disposed onto at least one surface of a substrate layer, the substrate layer comprising one or more materials selected from the group consisting of thermoplastic resins, thermosets, adhesives, coatings, glasses, metals, ceramics, cellulosic materials, and mixtures thereof.

The term "rubbery" used herein denotes the thermodynamic state of a polymer above its glass transition temperature.

The term "units derived from" used herein refers to polymer molecules that are synthesized according to known polymerization techniques wherein a polymer contains "units derived from" its constituent monomers.

The term "molecular weight" used herein refers to the weight average molecular weight of polymer molecules as determined by the gel permeation chromatography method.

The term "graftlinker" used herein refers to multi-functional monomers capable of forming multiple covalent bonds between polymer molecules of one type with polymer molecules of another type.

The term "crosslinker" used herein refers to multi-functional monomers capable of forming multiple covalent bonds between polymer molecules of the same type.

The term "alkyl (meth)acrylate" used herein refers to both alkyl acrylate and alkyl methacrylate monomer compounds.

The term "parts" used herein is intended to mean "parts by weight". Unless otherwise stated, "total parts by weight" do not necessarily add to 100.

The term "weight percent" used herein is intended to mean "parts per hundred".

All ranges disclosed herein are inclusive and combinable.

It has now been found that a particular combination of an acrylic core-shell graft-co-polymer, a processing aid polymer, and a VA lubricating copolymer forms a polymeric composition that is readily melt processed to provide a transparent, weatherable, impact resistant polymeric film or layer suitable for use as a capstock. The polymeric compositions of the present invention have 100 parts by weight of an acrylic core-shell graft-co-polymer, from 1 to 40 parts, preferably from 1 to 25 parts, and most preferably 2 to 5 parts by weight of a processing aid polymer, and from 0.1 to 10 parts, preferably 0.5 to 5, and most preferably 0.5 to 2 parts by weight of a VA lubricating copolymer.

The acrylic core-shell graft-co-polymer can contain from 20 to 70, preferably from 30 to 60, and most preferably from 35 to 45 parts by weight of a rubbery core polymer. Such rubbery core polymers can contain from 45 to 99.9, preferably from 80 to 99.5, and most preferably from 94 to 99.5 parts by weight of units derived from at least one C1–C8 alkyl acrylate monomer, from 0 to 35, preferably from 0 to 20, most preferably from 0 to 4.5 parts by weight of units derived from at least one ethylenically unsaturated copolymerizable monomer different from the at least one C1–C8 alkyl acrylate monomer, and from 0.1 to 5, preferably from 0.5 to 2, most preferably from 0.5 to 1.5 parts by weight of units derived from at least one crosslinker or graftlinker.

Suitable C1–C8 alkyl acrylate monomers include, methyl-, ethyl-, propyl-, n-butyl, sec-butyl-, tert-butyl, pentyl-, hexyl-, heptyl-, n-octyl-, and 2-ethylhexyl-acrylate. n-butyl acrylate and ethyl acrylate monomers are preferred.

Suitable crosslinkers or graftlinkers include divinyl benzene, butylene glycol dimethacrylate, alkanepolyol-polyacrylates or alkanepolyol-polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylolpropane triacrylate ("TMPTA") or trimethylolpropane trimethacrylate, and unsaturated carboxylic acid allyl esters such as allyl acrylate, diallyl maleate, and preferably allyl methacrylate.

As long as the core polymer remains rubbery, the core polymer may also contain additional units derived from at least one ethylenically unsaturated copolymerizable monomer different from the C1–C8 alkyl acrylate monomers such as C1–C8 alkyl methacrylates, vinyl aromatic monomers, vinyl-unsaturated carboxylic acids monomers, and nitrogen-containing vinyl unsaturated monomers. Examples of the C1–C8 alkyl methacrylate monomers are ethyl methacrylate, propyl methacrylate, butyl methacrylate, hexyl methacrylate, octyl methacrylate, and preferably methyl methacrylate. Examples of vinyl aromatic monomers include styrene, alpha-methyl styrene, para-methyl styrene, chlorostyrene, vinyl toluene, dibromostyrene, tribromostyrene, vinyl naphthalene, isopropenyl naphthalene, divinylbenzene and the like. The C1–C8 alkyl (meth)acrylate monomers are preferred in view of their enhanced weatherability of acrylic units over the other monomers. Examples of vinyl-unsaturated carboxylic acids monomers include methacrylic acid and acrylic acid. Examples of nitrogen-containing vinyl unsaturated monomers include acrylonitrile, methacrylonitrile, C1–C8 alkyl acrylamides, and C1–C8 alkyl methacrylamides.

The shell polymer grafted to the core polymer of the acrylic core-shell graft-co-polymer contains from 80 to 99, preferably from 85 to 97, and most preferably from 92 to 96 parts by weight of units derived from at least one C1 –C8 alkyl methacrylate monomer, and from 1 to 20, preferably from 3 to 15, most preferably from 4 to 8 parts by weight of units derived from at least one ethylenically unsaturated copolymerizable monomer different from the at least one C1–C8 alkyl methacrylate monomer, based on 100 parts by weight of the shell polymer.

Suitable polymers for the shell of the first core/shell polymer require that they have a glass transition temperature ("Tg") above 20° C. and therefore may also contain one or more units derived from ethylenically unsaturated copolymerizable monomers which are different from the at least one C1–C8 alkyl methacrylate monomer.

Suitable ethylenically unsaturated copolymerizable monomers include one or more of any of the following monomers: C1–C8 alkyl (meth)acrylates, acrylonitrile, methacrylonitrile, divinyl benzene, alpha-methyl styrene, para-methyl styrene, chlorostyrene, vinyl toluene, dibromostyrene, tribromostyrene, vinyl naphthalene, isopropenyl naphthalene, as well as higher carbon (C9–C20) alkyl (meth)acrylates such as decyl acrylate lauryl methacrylate, lauryl acrylate, stearyl methacrylate, stearyl acrylate, isobornyl methacrylate, and the like. The C1–C8 alkyl (meth)acrylate monomers are preferred for their enhanced weatherability characteristics. Most preferred are the C1–C8 alkyl acrylate monomers.

The processing aid polymers are needed to provide melt homogeneity to the polymeric composition of the present invention. The processing aid polymers useful in the composition of the present invention include those generally known in the art to be useful as processing aids in polyvinyl chloride, as described by D. L. Dunkleberger in *Plastics Additives and Modifiers Handbook*, J. Edenbaum, Ed., Ch. 60, "Processing Aids for Polyvinyl Chloride", Van Nostrand Reinhold, New York, 1992.

The processing aid polymers used in the composition of the present invention have molecular weights greater than 1 million g/mol, preferably in the range of from 1.5 million to 6 million g/mol. If the molecular weight is lower than 1 million g/mol then the melt strength of the polymeric composition will be too low to provide a smooth melt surface. If the molecular weight is greater than 6 million g/mol then the composition will be difficult to process at temperatures less than 210° C., resulting in waviness and inhomogeneities of the molten film or layer during calendering. If the processing aid molecular weight is 6 million or higher, then higher processing temperatures up to 250° C. are required.

In the present invention, at least 1 part processing aid polymer added to 100 parts of the acrylic core-shell graft-co-polymer is required to increase the viscosity and melt strength of the molten polymeric composition. This increase in viscosity and melt strength provides the composition the necessary rheological characteristics so that it can be melt processed using calendering, extrusion, or coextrusion techniques. During melt calendering, the processing aid polymer provides a smooth rolling bank aspect to the molten composition. If the amount of processing aid polymer is greater than 40 parts, then the composition may be difficult to melt and/or the viscosity will become too high to properly melt process. Although too high viscosities resulting from high amounts of processing aids can be mitigated using higher melt temperatures, it is desirable to maintain melt process temperatures less than 240° C., preferably less than 220° C. It is also preferable to keep process temperatures less than 200° C. during coextrusion of the polymeric composition of the present invention over thermally-sensitive thermoplastics such as PVC.

The processing aid polymer also functions to decrease the time required for the composition to melt or 'fuse' from a solid state into a molten state. Thus, the processing aid polymer is present to decrease the 'fusion time'; faster fusion is desirable for improving process efficiency.

The processing aid polymer is preferably composed of polymerized units derived from one or more C1–C8 n-alkyl acrylate and C1–C8 n-alkyl methacrylate monomers. Processing aid polymers are commonly prepared using emulsion polymerization techniques. Processing aids polymers are readily prepared using both single stage and multi-stage emulsion polymerizations with or without chain transfer agents to control the molecular weight. It is particularly preferred to provide processing aid polymers based on free-radical initiated emulsion polymerization techniques because such techniques prepare particle dispersions which can be readily blended with other particle dispersions (e.g., emulsion-prepared core-shell graft-co-polymers and emulsion-prepared vinyl aromatic lubricating copolymers) and isolated to a powder or pellet form.

These emulsion techniques may proceed by either single stage or multi-stage processes. Whether one stage, two-stage, or mult-stage, the molecular weight of the processing aids is determined as the weight average molecular weight of the entire processing aid polymer. A low level of sec-butyl mercaptan can be used in both stages to control molecular weight.

The VA lubricating copolymers are needed in the composition to eliminate sticking of the composition to calender roll equipment. In addition, the VA lubricating copolymers do not detract from the weatherabiity, printability, and transparency (low haze) of films and layers prepared using the compositions of present invention. To provide transparent (low haze) compositions, the VA lubricating polymers are compatible with the acrylic core-shell graft-co-polymer and processing aid polymers. The VA lubricating copolymers contain from 20% to 70%, preferably from 25% to 60%, and most preferably from 30% to 50% by weight of polymerizable units derived from one or more vinyl aromatic monomers, and from 30% to 80%, preferably from 40% to 75%, and most preferably from 50% to 70% by weight of polymerizable units derived from one or more ethylenically unsaturated monomers that are different than the vinyl aromatic monomers, based on the total weight of the VA lubricating copolymer. If less than 20% of polymerizaible units are derived from VA monomers, then the lubricant will cause the composition to be hazy. If more than 70% of the polymerizable units are derived from VA monomers, then the VA lubricating copolymer will be less compatible with the acrylic core-shell graft-co-polymer and processing aid polymer, resulting in diminished properties.

Suitable vinyl aromatic monomers include, for example, styrene and substituted styrenes having one or more alkyl, alkoxyl, hydroxyl, or halo substituent groups attached to the aromatic ring, including, for example, a-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene, and vinyl-substituted condensed aromatic ring structures, such as, for example, vinyl napthalene, vinyl anthracene; as well as mixtures of vinyl aromatic monomers. In a preferred embodiment, the vinyl aromatic monomer is styrene, or mixtures of vinyl aromatic monomers containing at least 50% styrene.

Suitable ethylenically unsaturated monomers include, but are not limited to, conjugated dienes (isoprene, 1,3-butadiene), vinyl halides, a-olefins (ethylene, propylene), vinyl esters of carboxylic acids (vinyl acetate), aryl and C1–C8 alkyl esters of acrylic, methacrylic, and a-phenylacrylic acid (methyl methacrylate, butyl acrylate, butyl methacrylate, benzyl acrylate, methyl a-phenylacrylate), acrylic, methacrylic, and a-phenylacrylic acids, amides of ethylenically unsaturated carboxylic acids (acrylamide, methacrylamide, a-phenylacrylamide), nitrites of ethylenically unsaturated carboxylic acids (acrylonitrile, methacrylonitrile, a-phenylacrylonitrile), alkyl vinyl ethers (methyl vinyl ether), unsaturated anhydrides of dicarboxylic acids (maleic anhydride), and the like, and mixtures thereof. The ethylenically unsaturated monomer is used in an amount less than that which will destroy the desired lubricity, printability, weatherability, and/or transparency of the polymer composition film or layer. It is particularly preferred that the ethylenically unsaturated monomers are derived from acrylonitrile, C1 to C8 alkyl acrylates, C1 to C4 alkyl methacrylates, and mixtures thereof.

In order to impart the lubricating properties to the composition of the present invention, the molecular weight of the VA lubricating copolymer should be in the range of from 20,000 to 1 million, preferably from 30,000 to 800,000, and most preferably from 100,000 to 800,000 g/mol. If the molecular weight is too low then print and substrate adhesion of the film or layer will be poor. If the molecular weight is too high then the VA lubricant does not provide proper lubrication to the composition.

Suitable VA lubricating copolymers can be prepared using free radical emulsion polymerization techniques. The emulsion product readily provides dispersions of VA lubricating copolymer particles that can be blended and isolated with particle dispersions of emulsion-prepared core-shell graft-co-polymers and emulsion-prepared processing aid polymers. These emulsion techniques may proceed by either single stage or multi-stage processes. It is particularly preferred that the VA lubricating copolymer is prepared using a multi stage process to prepare a heteropolymer containing a majority of the total amount of vinyl aromatic monomers in the first stage. Molecular weight of the VA lubricating copolymers can be controlled using suitable chain transfer agents.

Where a composition having superior tensile impact resistance is desired, the composition of the present invention may further contain up to 100, preferably from 5 to 50, and most preferably from 15 to 35 parts by weight of an acrylic impact modifier. The optional impact-modifiers are preferably prepared from C1–C8 alkyl acrylate and C1–C8 alkyl methacrylate monomers to impart to the composition of the present invention: high tensile impact resistance, high weatherability, good processability, clarity, compatibility, and adhesion to other materials.

The preferred optional impact modifiers are acrylic impact modifiers containing from 70 to 96, preferably from 75 to 94, and most preferably from 77 to 85 weight percent of a rubbery core polymer. Such rubbery core polymers contain from 50 to 99.9, preferably from 80 to 99.9, and most preferably from 90 to 99.9 weight percent of units derived from at least one C1–C8 alkyl acrylate monomer. As long as the core polymer remains rubbery, the core polymer of the acrylic impact modifier may also contain additional units derived from at least one copolymerizable monomers such as C1–C8 alkyl (meth)acrylate, vinyl aromatic monomers such as styrene, vinyl-unsaturated carboxylic acids monomers such as methacrylic acid, and nitrogen-containing vinyl unsaturated monomers such as acrylonitrile.

The hard stage polymer grafted to the core polymer of the acrylic impact modifier preferably contains from 90 to 100, and most preferably from 98 to 99.9 weight percent of units derived from at least one C1–C8 alkyl methacrylate monomer. The hard stage preferably forms a shell around the core polymer.

Suitable polymers for the shell of the core/shell polymer require that they have a glass transition temperature ("Tg") above 20° C. and therefore may also contain one or more units derived from ethylenically unsaturated copolymerizable monomers which are different from the at least one C1–C8 alkyl methacrylate monomer.

The optional impact modifiers may also have other or additional stages, which are polymerized after the formation of the rubbery core stage. Such stages may include an additional rubbery stage of a poly(alkyl acrylate), or additional stages of polymer mainly or exclusively polymerized from C1–C4 alkyl methacrylate.

Suitable acrylic impact modifiers can be obtained from the Rohm and Haas Company, Philadelphia, Pa. such as, but not limited to, PARALOID (TM) KM-334, which is 80 weight percent rubbery core polymer and 20 weight percent of a hard shell polymer.

For maximum transparency it is ideal that the refractive index of the impact modifier is within 0.02, preferably within 0.01 refractive index units of that of the acrylic core-shell graft-co-polymer, and/or that the amount of impact modifier is kept to 5 parts or less in the composition. However, where high impact is desired, but high transparency (low haze) is not required then the impact modifier may have a refractive index different by more than 0.02 units from that of the acrylic core-shell graft-co-polymer. As the amount of impact modifier is increased, the processability of the polymeric composition decreases, therefore the amount of optional impact modifier should be at most 100 parts per 100 parts acrylic core-shell graft-Co-polymer.

In preparing a dry powder or pellet form of the compositions of the present invention, the individual components can be blended as powders, aqueous-based, particle dispersions (such as their emulsion polymerization products), or a combination of both powders and particle dispersions, which are subsequently dried. It is particularly preferred that particle dispersions of each of the (A) acrylic graft-co-polymer, the (B) processing aid polymer, the (C) VA lubricating copolymer, and the optional (D) acrylic impact modifier polymer are blended ("emulsion blending") and co-isolated to form a powder or pellet form. Additional polymeric flowaids may be co-isolated with the emulsion blends to improve the powder flow properties.

If a pelletized form of the polymer composition is preferred for preparing film, sheet, and other various articles instead of a powder (e.g., to avoid dust), then the powder may be formed into pellets using any suitable plastics pelletization equipment and methods known in the plastics processing art. This can be especially useful wherein the components of the polymer composition can be compounded (mixed) and pelletized using standard plastics processing equipment.

A particular process can be used to prepare plastic films from the polymeric compositions of the present invention. The first step of the calendering process is feeding the polymer composition prepared according to the process of the present invention into a suitable pre-melting device, e.g., an extruder or kneader. Preferably, the components of the polymer composition are provided as a single powder or pellet blend form (as described supra) so that no mixing and adding of the components into the pre-melting device is needed.

The next step is heating the mixture to melt the thermoplastic materials (e.g., in the extruder or kneader). The temperature range should be at least 150° C., preferably in the range of from 150 and 220° C., to transform the composition of the present invention from a powder form into a gel form.

The next step is to heat the gel to at least 170° C. to form a homogeneous melt that can be formed into a smooth film. It is preferred that the temperature is in the range of from 170 to 250° C., most preferably in the range of from 190 to 200° C. If the melt temperature is too low temperature then the tensile impact resistance becomes poor. However, if the melt temperature is too high then the melt viscosity will be too low to process well.

The next step is forming the melt into a molten film having a thickness in the range of from 30 to 2,000 microns. This forming step may be accomplished with the use of a die fitted to the end of the pre-melting device. Preferably, this forming step is accomplished with the use of a calender having rolls, wherein the film thickness is controlled by the gap setting of the rolls. A calender is particularly useful for heating and preparing smooth films having good homogeneity and a good rolling bank aspect during processing, wherein some of the gel is extracted into the calender from the pre-melting device. The number of rolls in the calender is typically between 3 and 5, and the assembly of the rolls (vertical versus horizontal) may vary according to the normal usage of the calender. Film thickness is controlled by adjusting the gap width of the calender rolls and the stretching rate.

Because the material exiting the pre-melting device may not be completely melted, an optional device, such as a roll mill, may be placed between the end of the pre-melting device and the calender. Such an optional device can improve the melt output.

The final step is cooling the film. The film can be cooled using one or more chilled rolls (chilled water inside the roll), and after cooling, the film thickness is in the range of from 30 microns to 1 mm, and is most preferably 80–100 microns. The film is subsequently passed on one side of a roll to cool the film further so it can be handled and packaged for later processing (e.g., printing, cutting, and laminating to substrates to form composite articles).

A method for making a synthetic resin composite article is also envisioned which involves extruding a plurality of thermoplastic extrusion compounds and applying them together in a particular fashion. At least one of the thermoplastic extrusion compounds will be the polymer composition according to the first or second aspects of the present invention and disposed upon at least one other thermoplastic extrusion compound functioning as at least one substrate layer. It is also envisioned that the polymer composition can be extruded in multiple layers to allow for additional protection on one or more sides of the composite article.

The plastic film prepared according to the process and compositions of the present invention can be used as a capstock for applying to a variety of substrates. The plastic film may be affixedly disposed onto at least one surface of a substrate layer. Suitable substrate layers include one or more materials selected from thermoplastic resins, thermosets, adhesives, coatings, glasses, metals, ceramics, cellulosic materials, and mixtures thereof. The substrate layer is preferably a thermoplastic resin, most preferably a vinyl chloride resin, such as PVC.

A typical capstock for PVC can be from 30 microns to 1.0 mm thick, whereas the structural plastic can be about 0.8 to 1.2 mm thick for PVC siding applications, from 1.2 to 3.0 mm for PVC profile applications (e.g., PVC window frames, fencing, decking, and rain gutters), and from 100 microns to 2.0 mm for "credit card-type" applications.

The substrate layer may also be formed by an extrusion of a thermoplastic resin. The thermoplastic resin may be any of the extrudable thermoplastic resins known in the art. Preferred extrudable thermoplastic resins which are especially useful for making building products, but which require protection using a capstock layer against weathering and physical impacts, include PVC, chlorinated polyvinylchloride ("CPVC"), high impact polystyrene ("HIPS"), polypropylene ("PP") and acrylonitrile-butadiene-styrene ("ABS"). It is also preferred that the extrudable thermoplastic resins of the capstock and substrate layers adhere to one another to prevent delamination of the composite. Adhesion can be promoted through selection of resins which are compatible and/or miscible with one another (e.g., acrylic-based resins and chlorinated resins). Various methods known in the art, such as surface treatment with adhesion promoters, corona discharge, and/or application of an adhesive, are envisioned for improving the adhesion between the substrate and capstock layers of the composite aticle.

Synthetic resin composite articles can have a substrate layer of an extrudable thermoplastic resin, and a capstock layer of the polymer composition according to the first or second aspects of the present invention disposed thereon. The composite articles can be formed for example, by laminating preformed sheets or films of PVC structural plastic and the capstock together by thermal fusion or by adhesive.

It is also envisioned that the compositions of the present invention can be coextruded with PVC to make capstock-PVC composite articles. It is envisioned that the method for coextruding acrylic compositions and PVC described by Trabert et al. in U.S. Pat. No. 5,318,737 can be used for coextruding the compositions of the present invention with PVC.

The polymer composition may further contain at least one UV light stabilizer. Many suitable UV light stabilizers are described in *"Plastics Additives and Modifiers Handbook, Ch. 16 Environmental Protective Agents"*, J. Edenbaum, Ed., Van Nostrand (1992) pp. 208–271. Preferred UV light stabilizers are of the HALS-, benzotriazole-, and benzophenone-type compounds. UV light stabilizers further enhance the weatherability of the polymer composition.

The polymer composition may further contain at least one pigment when it is desirable to color the composition. Many suitable pigments are described in *"Plastics Additives and Modifiers Handbook, Section VIII," Colorants"*, J. Edenbaum, Ed., Van Nostrand (1992), pp. 884–954. Examples include organic pigments and inorganic pigments, and those preferred are resistant to UV and visible light exposure such as titanium dioxide (white).

EXAMPLES

The following abbreviations are employed in the examples:

ALMA=allyl methacrylate
BA=butyl acrylate
MMA=methyl methacrylate
Mw=weight average molecular weight
Sty=styrene In the description of the compositions, a single slash ("/") implies a copolymer, numbers separated by a single slash within parentheses indicates the copolymer weight ratio of the particular stage, while a double slash ("//") implies a separate stage. The general format for describing core-shell polymer compositions is thus "core composition"//"shell composition". Numbers refer to parts by weight and do not necessarily add to 100.

Preparation of Acrylic Core-shell Graft-co-polymer (A)

An acrylic core-shell graft copolymer was prepared inaccording to the emulsion polymerization preparation of the latex heteropolymer described in U.S. Pat. No. 3,812,205, Example I. The resulting acrylic core-shell graft copolymer (A) had the following composition: 40 (99 BA/1 ALMA)// 60 (95 MMA/5 BA). This polymer has a 40% acrylic rubbery core polymer and 60% of an acrylic hard shell polymer. The total solids weight fraction of the resulting polymer particle dispersion was 53%, the final particle size was 180–200 nm, and the pH was 2.7–3.0.

A portion of this particle dispersion was co-spray dried with a polymeric flow aid to form a powder.

Processing Aid Polymers (B)

Commercially available processing aid polymers (Rohm and Haas Company, Philadelphia, Pa.) having molecular weights in the range of from 1.5 million to 6 million were used in the examples: PARALOID (TM) K-120N; PARALOID (TM) K-125; and PARALOID (TM) K-400.

Lubricants (C)

A VA lubricating copolymer ("VA-Lube") having an overall composition 36 Sty/41 MMA/23 BA was prepared in emulsion according to the procedure described in U.S. Pat. No. 3,859,384, Example I, composition B, wherein the composition of the first stage was 35 Sty/23 BA/2 MMA and the composition of the second stage was 39 MMA/1 Sty. The overall weight average molecular weight was 100,000 g/mol and the total solids weight fraction was 52%. A portion of the emulsion was spray dried to form a free-flowing powder.

Comparative lubricants that were tested include LOXIOL G-32 (Henkel) which is a high fatty acid ester lubricant, A–C 307A (Honeywell) which is an oxidized polyethylene wax, METABLEN L-1000 (Mitsubishi Rayon), which is an all-acrylic polymeric lubricant.

Optional Acrylic Impact Modifiers (D)

The acrylic impact modifier used, PARALOID (TM) KM-334 is 80 weight percent of rubbery core polymer and 20 weight percent of a hard shell polymer, and is commercially available the Rohm and Haas Company, Philadelphia, Pa.

Examples 1 and Comparisons

Film Chracteristics

Compositions of the acrylic core-shell graft-co-polymer (A), processing aid polymers (B), and lubricants (C) were prepared by mixing the powder components in a mixer at ambient temperature for two minutes. Each composition (200 grams) was tested for its film processability using a laboratory two-roll mill (Collin). The process temperature was in the range 180 to 210° C., and the rolls turned in the opposite direction to prepare 300 micron thick films. Films were removed from the rolls and observations concerning film processability, melt strength, sticking, and haziness were made. Poor processing characteristics was evidenced by difficulting melting the composition, poor melt properties, poor melt strength, poor film processing, poor rolling bank aspect, or rough film aspect. Film clarity was identified as clear, slightly hazy, hazy, or opaque. Percent haze values were also measured for several 130 micron thick films using a Hunterlab Spectrophotometer by % transmission. "Clear" films had a percent haze less than 20; "slightly hazy" films had a percent haze in the range of 20 to 40; and "hazy" films had a percent haze greater than 40. Compositions and results are listed in Table 1.

The following conclusions are drawn from these results: a lubricant is necessary to prevent sticking of the film to the equipment; less than 40 parts of a processing aid polymer is necessary to provide good film processing characteristics and good quality films; the vinylaromatic copolymer lubricant (VA-Lube) provides the clearest films in combination with processing aid polymers, whereas the fatty acid ester lubricant (G-32), the all-acrylic lubricant (L-1000), and the oxidized polyethylene wax lubricant (A–C 307A) all provide hazy films in combination with a processing aid polymer.

TABLE 1

Compositions and Film Characteristics

| Ex. | Graft-co-Polymer A Parts | Processing Aid Polymer Name/Parts | Lubricant Name/Parts | Film Characteristics Processing/Clarity/Sticking |
|---|---|---|---|---|
| Comp. A | 100 | — | G-32/2.0 | Poor/slightly Hazy/None |
| Comp. B | 100 | — | VA-Lube/1.0 | Poor/Clear/None |
| Comp. C | 100 | K-125/2 | — | Good/Clear/Sticking |
| Comp. D | 100 | K-120N/25 | — | Good/Clear/Sticking |
| Comp. E | 100 | K-400/25 | — | Poor/Clear/Sticking |
| Comp. F | 100 | K-120N/43 | G-32/2.9 | Poor/Hazy/None |
| Comp. G | 100 | K-125/40 | VA-Lube/10 | Poor/Slightly Hazy/None |
| Comp. H | 100 | K-120N/5.0 | L-1000/10 | Good/Hazy/None |
| Comp. I | 100 | K-120N/5.0 | A-C 307A/10 | Good/Hazy/None |
| 1 | 100 | K-120N/5.0 | VA-Lube/10 | Good/Clear/None |

Examples 2–4

Compositions and Tensile Impact Strength

Examples 2 and 4:

Compositions of the acrylic core-shell graft-co-polymer (A), K-125 processing aid polymers (B), VA-Lube lubricant (C), and KM-344 impact modifier (D) were prepared by mixing the powdered components in a mixer at ambient temperature for two minutes.

Example 3:

Compositions of the acrylic core-shell graft-co-polymer (A), K-125 processing aid polymers (B), VA-Lube lubricant (C), and KM-344 impact modifier (D) were prepared by blending emulsions of the polymeric components in an agitator tank at 40° C. for one hour. The emulsion blend was subsequently spray dried with 4.3% of an emulsified polymeric flow aid. The melt flow index of the composition was 1.52 gram per 10 minutes (ASTM D1238-90b).

Each composition (150 grams) was tested for its film processability using a laboratory two-roll mill (Collin) and tensile impact resistance. The process temperature was 190° C., with the rolls turning in the opposite direction to prepare 250 micron thick films. The films were removed from the rolls and tested in the calendering and transverse direction for their tensile impact resistance according to ISO 8256/Type 3. The results for the calendering and transverse directions were combined and are reported in Table 2 along with the standard deviation. These results show that the tensile impact strength can be doubled or tripled by adding an acrylic impact modifier.

TABLE 2

Compositions and Tensile Impact Resistance

| Ex. | Graft-co-Polymer A Parts | Processing Aid Polymer Parts | Lubricant Parts | Impact Modifier Parts | Tensile Impact Resistance KJ/m$^2$ (std deviation) |
| --- | --- | --- | --- | --- | --- |
| 2 | 100 | 4 | 1.0 | — | 95 (9) |
| 3 | 100 | 5 | 1.25 | 25 | 194 (59) |
| 4 | 100 | 8 | 2.0 | 100 | 302 (86) |

The compositions of example 3 was further subjected to a dynamic stability (thermal degradation) test wherein the composition was processed for 195 minutes on a roll mill at 200° C. and sampled every three minutes to observe the evolution of color. No color change indicated no thermal degradation.

The composition of example 3 was further subjected to accelerated weathering studies. The films of Example 3 were laminated to 3.0 mm thick PVC substrates using a laboratory laminating device to form composite articles. The composite articles were subjected to QUV accelerated weather testing (ASTM D4329 Cycle C (Q-UVA 340 light source; eight hours light, four hours dark with condensation at 60° C.). No change in color was observed after 300 hours.

I claim:

1. A polymeric composition, comprising:
   (A) 100 parts by weight of an acrylic core-shell graft-co-polymer, comprising
      (i) from 20% to 70% by weight of an acrylic rubbery core polymer, based on the total weight of the acrylic core-shell graft-co-polymer and
      (ii) from 30% to 80% by weight of an acrylic hard shell polymer, based on the total weight of the acrylic core-shell graft-co-polymer wherein the acrylic hard shell polymer contains 80 to 99 parts by weight of units derived from at least one C1–C8 alkyl methacrylate monomer, based on 100 parts by weight of the acrylic hard shell polymer;
   (B) based on 100 parts by weight of the acrylic core-shell polymer, from 1 to 40 parts by weight of a processing aid polymer, wherein the weight average molecular weight of the processing aid polymer is greater than 1 million g/mol and
   (C) based on 100 parts by weight of the acrylic core-shell polymer, from 0.1 to 10 parts by weight of a VA lubricating copolymer, comprising
      (i) from 20% to 70% by weight of polymerizable units derived from one or more vinyl aromatic monomers, based on the total weight of the VA lubricating copolymer and
      (ii) from 30% to 80% by weight of polymerizable units derived from one or more ethylenically unsaturated monomers based on the total weight of the VA lubricating copolymer, wherein the weight average molecular weight of the VA lubricating polymer is in the range of from 20,000 g/mol to 1 million g/mol.

2. The composition of claim 1,
   wherein the amount of the (B) processing aid polymer is in the range of from 1 to 25 parts by weight, based on 100 parts by weight of the acrylic core-shell polymer; and
   the amount of the (C) VA lubricating copolymer is in the range of from 0.5 to 2.0 parts by weight, based on 100 parts by weight of the acrylic core-shell polymer.

3. The composition of claim 1, wherein
   the percentage of the (i) core polymer of the (A) graft-co-polymer is in the range of from 30% to 60%, and
   the percentage of the (ii) shell polymer of the (A) graft-co-polymer is in the range of from 40% to 70%.

4. The composition of claim 1, wherein the weight average molecular weight of the (B) processing aid polymer is in the range of from 1.5 million to 6 million g/mol.

5. The composition of claim 1, wherein the (C) VA lubricating copolymer is prepared by a multistage process.

6. The composition of claim 1, further comprising, based on 100 parts by weight of the acrylic core-shell polymer, up to 50 parts by weight of a second core-shell graft-co-polymer, which is compositionally different from the acrylic core-shell graft-co-polymer in component (A).

7. A polymeric composition, comprising:
   (A) 100 parts by weight of an acrylic core-shell graft-co-polymer, comprising
      (i) from 35% to 45% by weight of an acrylic rubbery core polymer based on the total weight of the acrylic core-shell graft-co-polymer; and
      (ii) from 55% to 65% by weight of an acrylic hard shell polymer based on the total weight of the acrylic core-shell graft-co-polymer; wherein the acrylic hard shell polymer contains 80 to 99 parts by weight of units derived from at least one C1–C8 alkyl methacrylate monomer, based on 100 parts by weight of the acrylic hard shell polymer;
   (B) based on 100 parts by weight of the acrylic core-shell polymer, from 2 to 25 parts by weight of a processing aid polymer, wherein the weight average molecular weight of the processing aid polymer is in the range of 1.5 to 6 million g/mol
   (C) based on 100 parts by weight of the acrylic core-shell polymer, from 0.5 to 2 parts by weight of a VA lubricating copolymer, comprising
      (i) from 20% to 70% by weight of polymerizable units derived from styrene, based on the total weight of the VA lubricating copolymer, and
      (ii) from 30% to 80% by weight of polymerizable units selected from the group consisting of acrylonitrile, C1 to C8 alkyl acrylates, C1 to C4 alkyl methacrylates, and mixtures thereof, based on the total weight of the VA lubricating copolymer;

wherein the weight average molecular weight of the (C) VA lubricating polymer is in the range of from 50,000 to 800,000 g/mol; and (D) based on 100 parts by weight of the acrylic core-shell polymer, from 5 to 50 parts by weight of a second core-shell graft-co-polymer, which is compositionally different from the acrylic core-shell graft-co-polymer in component (A).

8. A plastic film prepared from the polymeric composition according to any one of claims 1 to 7.

9. A process for preparing a plastic film, comprising the steps of
(I) feeding the polymeric composition according to any one of claims 1 to 7 into a pre-melting device;
(II) heating the polymeric composition to a temperature of at least 150°C in the pre-melting device to form a gel;
(III) heating the gel to a temperature of at least 170°C to form a melt;
(IV) forming the melt into a molten film having a thickness in the range of from 30 to 2,000 microns; and
(V) cooling the molten film.

10. A composite article comprising the plastic film prepared according to the process of claim 9, the plastic film affixedly disposed onto at least one surface of a substrate layer, the substrate layer comprising one or more materials selected from the group consisting of thermoplastic resins, thermosets, adhesives, coatings, glasses, metals, ceramics, cellulosic materials and mixtures thereof.

11. A polymeric composition, consisting of:
(A) 100 parts by weight of an acrylic core-shell graft-co-polymer, comprising
  (i) from 20% to 70% by weight of an acrylic rubbery core polymer based on the total weight of the acrylic core-shell graft-co-polymer and
  (ii) from 30% to 80% by weight of an acrylic hard shell polymer based on the total weight of the acrylic core-shell graft-co-polymer wherein the acrylic hard shell polymer contains 80 to 99 parts by weight of units derived from at least one C1–C8 alkyl methacrylate monomer, based on 100 parts by weight of the acrylic hard shell polymer;
(B) based on 100 parts by weight of the acrylic core-shell polymer, from 1 to 40 parts by weight of a processing aid polymer, wherein the weight average molecular weight of the processing aid polymer is greater than 1 million g/mol;
(C) based on 100 parts by weight of the acrylic core-shell polymer, from 0.1 to 10 parts by weight of a VA lubricating copolymer, comprising
  (i) from 20% to 70% by weight of polymerizable units derived from one or more vinyl aromatic monomers, based on the total weight of the VA lubricating copolymer; and
  (ii) from 30% to 80% by weight of polymerizable units derived from one or more ethylenically unsaturated monomers based on the total weight of the VA lubricating copolymer, wherein the weight average molecular weight of the VA lubricating polymer is in the range of from 20,000 g/mol to 1 million g/mol;

(D) an optional UV light stabilizer component; and
(E) an optional pigment component.

12. A polymeric composition, consisting of:
(A) 100 parts by weight of an acrylic core-shell graft-co-polymer, comprising
  (i) from 20% to 70% by weight of an acrylic rubbery core polymer based on the total weight of the acrylic core-shell graft-co-polymer and
  (ii) from 30% to 80% by weight of an acrylic hard shell polymer based on the total weight of the acrylic core-shell graft-co-polymer wherein the acrylic hard shell polymer contains 80 to 99 parts by weight of units derived from at least one C1–C8 alkyl methacrylate monomer, based on 100 parts by weight of the acrylic hard shell polymer;
(B) based on 100 parts by weight of the acrylic core-shell polymer, from 1 to 40 parts by weight of a processing aid polymer, wherein the weight average molecular weight of the processing aid polymer is greater than 1 million g/mol;
(C) based on 100 parts by weight of the acrylic core-shell polymer, from 0.1 to 10 parts by weight of a VA lubricating copolymer, comprising
  (i) from 20% to 70% by weight of polymerizable units derived from one or more vinyl aromatic monomers, based on the total weight of the VA lubricating copolymer and
  (ii) from 30% to 80% by weight of polymerizable units derived from one or more ethylenically unsaturated monomers based on the total wei&ht of the VA lubricating copolymer, wherein the weight average molecular weight of the VA lubricating polymer is in the range of from 20,000 g/mol to 1 million g/mol;

(D) based on 100 parts by weight of the acrylic core-shell polymer, from 0 to 100 parts by weight of a second core-shell graft:co polymer, which is compositionally different from the acrylic core-shell graft-co-polymer in component (A);
(E) an optional UV light stabilizer component; and
(F) an optional pigment component.

* * * * *